United States Patent
Li et al.

(10) Patent No.: US 12,044,660 B2
(45) Date of Patent: Jul. 23, 2024

(54) PREDICTING SYSTEM AND METHOD FOR UNIAXIAL COMPRESSIVE STRENGTH OF ROCK

(71) Applicant: SHANDONG UNIVERSITY, Shandong (CN)

(72) Inventors: Shucai Li, Jinan (CN); Peng Lin, Jinan (CN); Heng Shi, Jinan (CN); Zhenhao Xu, Jinan (CN); Youbo Liu, Jinan (CN); Tengfei Yu, Jinan (CN); Zehua Bu, Jinan (CN); Xiaote Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 325 days.

(21) Appl. No.: 17/640,915

(22) PCT Filed: Jan. 21, 2020

(86) PCT No.: PCT/CN2020/073583
§ 371 (c)(1),
(2) Date: Mar. 7, 2022

(87) PCT Pub. No.: WO2021/042667
PCT Pub. Date: Mar. 11, 2021

(65) Prior Publication Data
US 2022/0334035 A1    Oct. 20, 2022

(30) Foreign Application Priority Data
Sep. 6, 2019    (CN) .......................... 201910843306.6

(51) Int. Cl.
*G01N 3/42*    (2006.01)
*G01N 3/08*    (2006.01)
*G01N 29/07*    (2006.01)

(52) U.S. Cl.
CPC ................. *G01N 3/08* (2013.01); *G01N 3/42* (2013.01); *G01N 29/07* (2013.01);
(Continued)

(58) Field of Classification Search
CPC ........... G01N 3/08; G01N 3/42; G01N 29/07; G01N 2203/0019; G01N 2203/0647;
(Continued)

(56) References Cited

U.S. PATENT DOCUMENTS 5,036,696 A    8/1991 Ahrens et al.
5,789,681 A *  8/1998 Angley ................ G01N 33/383
                                            73/803
(Continued)

FOREIGN PATENT DOCUMENTS

CN    105784494 A    7/2016
CN    107192624 A    9/2017
(Continued)

OTHER PUBLICATIONS

May 27, 2020 International Search Report issued in International Patent Application No. PCT/CN2020/073583.
(Continued)

*Primary Examiner* — David J Bolduc
(74) *Attorney, Agent, or Firm* — Oliff PLC

(57) ABSTRACT

A predicting system and method for the uniaxial compressive strength of rock include a point loading strength test module, a longitudinal wave velocity test module, a rock rebound value test module and a strength prediction module, wherein the longitudinal wave velocity test module performs longitudinal wave velocity tests on the rock, and transfers the longitudinal wave velocity of the rock to the strength prediction module; the rock rebound test module performs rebound test on the rock, and transfers the rebound value of the rock to the strength prediction module; the point loading
(Continued)

strength test module performs image acquisition on a fracture surface of the rock after being loaded and fractured by the point loading test, and calculates the area of the fracture surface; and the strength prediction module outputs a uniaxial compressive strength prediction result of the rock according to the received information and a preset prediction model.

10 Claims, 3 Drawing Sheets

(52) U.S. Cl.
CPC ............... *G01N 2203/0019* (2013.01); *G01N 2203/0647* (2013.01); *G01N 2291/0232* (2013.01)

(58) Field of Classification Search
CPC ... G01N 2291/0232; G01N 2203/0048; G01N 2203/0252; G01N 2291/011; G01N 29/043; G01N 3/00; G01N 2291/0421
See application file for complete search history.

(56) References Cited

U.S. PATENT DOCUMENTS

| | | | | |
|---|---|---|---|---|
| 6,134,954 | A * | 10/2000 | Suresh | G01N 3/42 |
| | | | | 702/33 |
| 6,978,664 | B1 * | 12/2005 | Uchic | B82Y 35/00 |
| | | | | 73/85 |
| 2010/0307258 | A1 * | 12/2010 | Brandestini | G01N 3/52 |
| | | | | 73/803 |
| 2017/0005220 | A1 * | 1/2017 | Kautzsch | H01L 31/173 |
| 2019/0178765 | A1 * | 6/2019 | Saleem | G01N 29/07 |
| 2020/0217766 | A1 * | 7/2020 | Lee | G01N 3/44 |

FOREIGN PATENT DOCUMENTS

| | | |
|---|---|---|
| CN | 108362580 A | 8/2018 |
| CN | 109163997 A | 1/2019 |
| CN | 109443946 A | 3/2019 |
| CN | 109975412 A | 7/2019 |
| IN | 109253921 A | 1/2019 |

OTHER PUBLICATIONS

May 27, 2020 Written Opinion issued in International Patent Application No. PCT/CN2020/073583.

* cited by examiner

PREDICTING SYSTEM AND METHOD FOR UNIAXIAL COMPRESSIVE STRENGTH OF ROCK

FIELD OF THE INVENTION

The present disclosure belongs to the field of compressive strength test of rocks, and relates to a predicting system and method for the uniaxial compressive strength of rock.

BACKGROUND OF THE INVENTION

The statement of this section merely provides background art information related to the present disclosure, and does not necessarily constitute the prior art.

Rock strength is the most basic parameter in rock mechanics, and is an indispensable basic parameter for tunnel excavation scheme selection, tunnel lining and support, tunnel water inrush disaster prevention and control, etc. *The Standard for Engineering Classification of Rock Mass* also regards the uniaxial compressive strength of rock as a quantitative index of rock hardness. The laboratory uniaxial compressive strength test to obtain the rock strength of a construction site often requires five steps: coring with a drilling rig, rock transportation, processing and grinding of standard parts, compression test, and data processing. However, difficult rock sampling, high cost for obtaining a standard sample, and long time for determining the uniaxial compressive strength of rock make it difficult to meet the requirements for real-time obtaining of the uniaxial compressive strength of the rock on the construction site. In order to meet the requirements of the construction site for rock strength, a point loading test is used in the prior art. The point loading strength test can be quickly performed on irregular and cylindrical samples, is a method for simply and quickly measuring rock strength, and can indirectly obtain the uniaxial compressive strength of rock by testing point loading strength. However, this method has certain defects, such as inaccuracy in area measurement of rock after fracture, and low precision in predicting the uniaxial compressive strength by using the point loading strength.

SUMMARY OF THE INVENTION

In order to solve the above problems, the present disclosure proposes a predicting system and method for the uniaxial compressive strength of rock, which can quickly obtain the point loading strength, wave velocity and rebound value of the rock, predict the lithology of the rock by using machine learning technology and select a corresponding rock strength prediction model to provide a uniaxial compressive strength prediction result.

According to some embodiments, the present disclosure adopts the following technical solutions:

A predicting system for the uniaxial compressive strength of rock, including a point loading strength test module, a longitudinal wave velocity test module, a rock rebound value test module and a strength prediction module, wherein:
the longitudinal wave velocity test module is configured to perform longitudinal wave velocity test on the rock, and transfer the longitudinal wave velocity of the rock to the strength prediction module;
the rock rebound test module is configured to perform rebound test on the rock, and transfer the rebound value of the rock to the strength prediction module;
the point loading strength test module includes a point loading tester, a rock fracture surface acquisition module, and a rock fracture surface area calculation module; the point loading tester performs point loading test on the rock and transfers point loading stress and rock deformation data to the strength prediction module, the rock fracture surface acquisition module performs image acquisition on a fracture surface of the rock after being loaded and fractured by the point loading test, and the rock fracture surface area calculation module processes the image acquisition result to calculate the area of the fracture surface of the rock;
the strength prediction module is configured to output a uniaxial compressive strength prediction result of the rock according to the received information and a pre-trained neural network model.

As a possible implementation manner, the point loading tester includes a base, an upper conical indenter, an elastic component, support beams, support columns, a jack and a lower conical indenter, wherein two support columns perpendicular to the base are arranged on the base, a support beam I and a support beam II are arranged between the two support columns, the lower conical indenter is fixed on the support beam II, the jack is arranged on the base, the jack can drive the support beam I and the upper conical indenter to move up and down, the upper conical indenter and the lower conical indenter are arranged oppositely, and the elastic component is arranged on the support columns or the support beam II and can movably fix the rock between the upper conical indenter and the lower conical indenter.

The point loading tester further includes a displacement meter and a pressure sensor, the pressure sensor detects the pressure of the upper conical indenter or the lower conical indenter, and the displacement meter is fixed on the support column and can collect the deformation of the rock.

As a possible implementation manner, the elastic component includes elastic ropes and an elastic net pocket, one end of the elastic rope is arranged on the support column or the support beam, the other end of the elastic rope is connected with the elastic net pocket, and the inside of the elastic net pocket is used for accommodating the rock.

As a possible implementation manner, the rock fracture surface acquisition module includes columns, a platform, a camera, a flat plate, a first rubber block and a second rubber block; at least four columns are vertically arranged on the platform, ends of the flat plate are provided with threaded holes, the four columns respectively pass through the ends of the flat plate, at least the bottoms of the columns have threads adapted to the threaded holes, the first rubber block is arranged on the platform, the second rubber block is arranged at the lower end of the flat plate, the second rubber block and the first rubber block are arranged oppositely, and the camera is arranged at the upper end of the platform.

As a possible implementation manner, four columns are vertically arranged on the platform, four ends of the flat plate are provided with threaded holes, each column passes through the corresponding threaded hole of the flat plate, and at least the bottoms of the columns have threads adapted to the threaded holes.

As a possible implementation manner, the longitudinal wave velocity test module includes a wave velocity measuring instrument, a pedestal, springs, bolts, spacers and transducers, wherein the transducers are located on both sides of the rock; the transducers are connected to the wave velocity measuring instrument, the opposite bolts are arranged inward at two ends of the pedestal, the bolts are sleeved with the springs, the spacers are arranged at the front ends of the springs, each spacer abuts against the corresponding transducer, and nuts movable along the bolts to compress the springs are arranged on the bolts.

As a possible implementation manner, the rock rebound test module is a rebound tester for measuring the rebound value of the rock.

A working method based on the above system includes the following steps:

performing longitudinal wave velocity test on rock by using the longitudinal wave velocity tester; performing rebound test on the rock by using the rebound tester;

observing the shape of the rock, pre-selecting a rock load point, putting the rock into the elastic net pocket, fixing the rock to the lower part of the upper conical indenter, and fracturing the rock by pressing;

calculating a point loading strength by means of the area of a fracture surface of the rock and rock fracture load, and transferring the point loading calculation result to the strength prediction module; the strength prediction module predicting the lithology of the rock according to the fracture surface of the rock, predicting the strength of the rock by means of the point loading strength, longitudinal wave velocity and rebound value of the rock, and outputting the prediction results.

As a possible implementation manner, a calibration block is placed beside the fractured rock, the posture of the fractured rock is adjusted, the fractured surface is adjusted to be parallel to the plane of the platform, and the cross section of the fractured rock is photographed. The number of pixels occupied by the fracture surface of the rock is calculated by a region growing algorithm, the number of pixels occupied by the calibration block is calculated by the region growing algorithm, and under the condition that the area of the calibration block is known, the area of the fracture surface of the rock can be solved by means of the ratio of the number of pixels occupied by the fracture surface of the rock to the number of pixels occupied by the calibration block.

As a further limitation, the specific process of calculating the number of pixels occupied by the calibration block by the region growing algorithm includes:

1) performing column sum processing on RGB values of the captured image respectively to form row vectors, and extracting left and right boundaries on the basis of the difference in color between the rock and a background plate;
2) performing row sum processing on the RGB values of the captured image respectively to form column vectors, and extracting up and down boundaries on the basis of the difference in color between the rock and the background plate to form a rock region box;
3) graying the image;
4) averaging the gray values of all pixels in the rectangular rock region box to form a screening threshold;
5) determining the gray values of all the pixels in the rock region box; if the gray values are greater than the screening threshold, determining the pixels as quartz seed points to form preliminary quartz region growing seeds;
6) sequentially popping up the quartz region growing seed points, and determining the relationship between 8 neighborhoods around a seed point; if the absolute values of differences between the gray values of the 8 neighborhood pixels and the seed pixel are less than a certain threshold T, regarding the point as a seed point for next growth; and
7) repeating step 6) and ending the growth until every point in the rock region box has been determined, the number of seed points being the number of pixels on the fracture surface of the rock.

The rock and the background plate are obviously different in color, so the RGB row vectors have sudden changes near edges of the rock. On this basis, a left edge and a right edge are preliminarily extracted. The rock and the background plate are obviously different in color, so the RGB column vectors have sudden changes near edges of the rock. On this basis, an upper edge and a lower edge are preliminarily extracted.

The strength prediction module includes a trained neural network model. The point loading strength, longitudinal wave velocity and rebound value of the rock are imported into the model, and the model provide a prediction result.

Compared with the prior art, the beneficial effects of the present disclosure are:

Each module of the present disclosure is simple in structure and can be carried to the construction site for operation.

The present disclosure uses the image processing technology to process the cross-sectional image of the fractured rock and calculate the cross-sectional area accurately and quickly.

The present disclosure predicts the lithology by deep learning technology, and comprehensively considers the longitudinal wave velocity, point loading strength, and rebound value when predicting the uniaxial compressive strength, so the consideration is more comprehensive, the result of predicting the uniaxial compressive strength is more accurate, and the requirement of a construction site for rock strength can be met with low cost.

In the present disclosure, the elastic net pocket is used as a flexible constraint, and the rock can be bound to one side of the conical indenter without obvious stress constraint on the rock, which doesn't affect the test result; when the elastic net pocket binds the rock to one side of the conical indenter, the conical indenter does not need to be manually assisted in clamping the rock, which avoids potential danger of hurting the test personnel; the elastic net pocket is portable and foldable, and does not occupy too much space.

In the present disclosure, the rock is an aggregate composed of one or more mineral particles and contains a large number of fissures and cracks inside, and the closed state of these cracks affect the longitudinal wave test results; during the test, the transducers need to clamp the rock, and under the action of external load, the internal fissures of the rock close, which affect the longitudinal wave test results; different external forces produce different longitudinal wave test results, and especially for the rock with a small longitudinal wave velocity, the external force have greater impact; the longitudinal wave velocity test module used can control the magnitude of the external force, which enables the final rock strength prediction to be more accurate.

The traditional calculation method includes measuring the length and the width of the fracture surface with a tape measure and multiplying the length and the width to obtain the final area. For a regular fracture surface, this area has a small error, but in fact, the fracture surface has obvious irregularities. By calculating the area at the pixel level of the rock image, in the present disclosure, the area calculation accuracy is high, which can solve the shortcomings of the traditional calculation method.

BRIEF DESCRIPTION OF THE DRAWINGS

The accompanying drawings constituting a part of the present disclosure are intended to provide a further understanding of the present disclosure, and the illustrative embodiments of the present disclosure and the descriptions thereof are intended to interpret the present disclosure and do not constitute improper limitations to the present disclosure.

Figure 1:
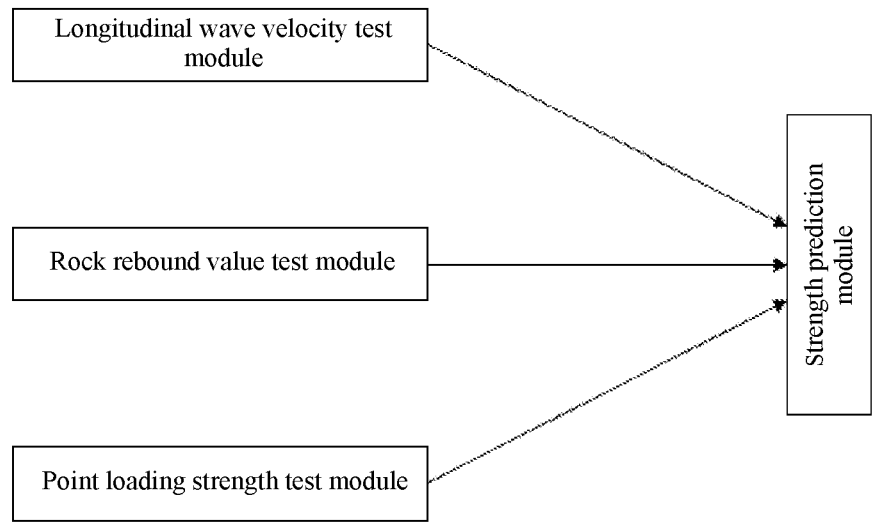
FIG. 1 is a system frame diagram of the present disclosure.

In which: 1. Pressure sensor, 2. Connecting hole, 3. Elastic rope, 4. Elastic net pocket, 5. Test block, 6. Upper conical indenter, 7. Support beam I, 8. Support column, 9. Jack, 10. Lower conical indenter, 11. Support beam II, 12. Displacement meter, 13. Column, 14. Calibration block, 15. Fractured rock, 16. Platform, 17. Camera, 18. Flat plate, 19. Support shell, 20. First rubber block, 21. Second rubber block, 22. Wave velocity measuring instrument, 23. Pedestal, 24. Nut, 25. Spring, 26. Stud, 27. Spacer, 28. Transducer.

DETAILED DESCRIPTION OF THE EMBODIMENTS

The present disclosure will be further illustrated below in conjunction with the accompanying drawings and embodiments.

It should be noted that the following detailed descriptions are exemplary and are intended to provide further descriptions of the present disclosure. All technical and scientific terms used herein have the same meanings as commonly understood by those ordinary skilled in the art to which the present disclosure belongs, unless specified otherwise.

It should be noted that terms used herein are intended to describe specific embodiments only rather than to limit the exemplary embodiments according to the present disclosure. As used herein, the singular form is also intended to comprise the plural form unless otherwise indicated in the context. In addition, it should be understood that when the terms "include" and/or "comprise" are used in the description, they are intended to indicate the presence of features, steps, operations, devices, components and/or combinations thereof.

In the present disclosure, the terms such as "upper", "lower", "left", "right", "front", "rear", "vertical", "horizontal", "side", and "bottom" indicate the orientation or positional relationships based on the orientation or positional relationships shown in the drawings, are only relationship terms determined for the convenience of describing the structural relationships of various components or elements of the present disclosure, but do not specify any component or element in the present disclosure, and cannot be understood as limitations to the present disclosure.

In the present disclosure, the terms such as "fixed", "connected" and "coupled" should be generally understood, for example, the "connected" may be fixedly connected, detachably connected, integrally connected, directly connected, or indirectly connected by a medium. For a related scientific research or technical person in this art, the specific meanings of the above terms in the present disclosure may be determined according to specific circumstances, and cannot be understood as limitations to the present disclosure.

A predicting system for the uniaxial compressive strength of rock, as shown in FIG. 1, includes a point loading strength test module, a longitudinal wave velocity test module, a rock rebound value test module and a strength prediction module.

The point loading strength test module is configured to perform point loading test on the rock and transmit the result to the strength prediction module; the longitudinal wave velocity test module is configured to test the longitudinal wave velocity of the rock and transmit the longitudinal wave velocity of the rock to the strength prediction module; the rock rebound test module is configured to perform rebound test on the rock and transmit the rebound value of the rock to the strength prediction module; and the strength prediction module is configured to collect the data collected by other modules and predict the uniaxial compressive strength of the rock by using a trained prediction model.

Figure 2:
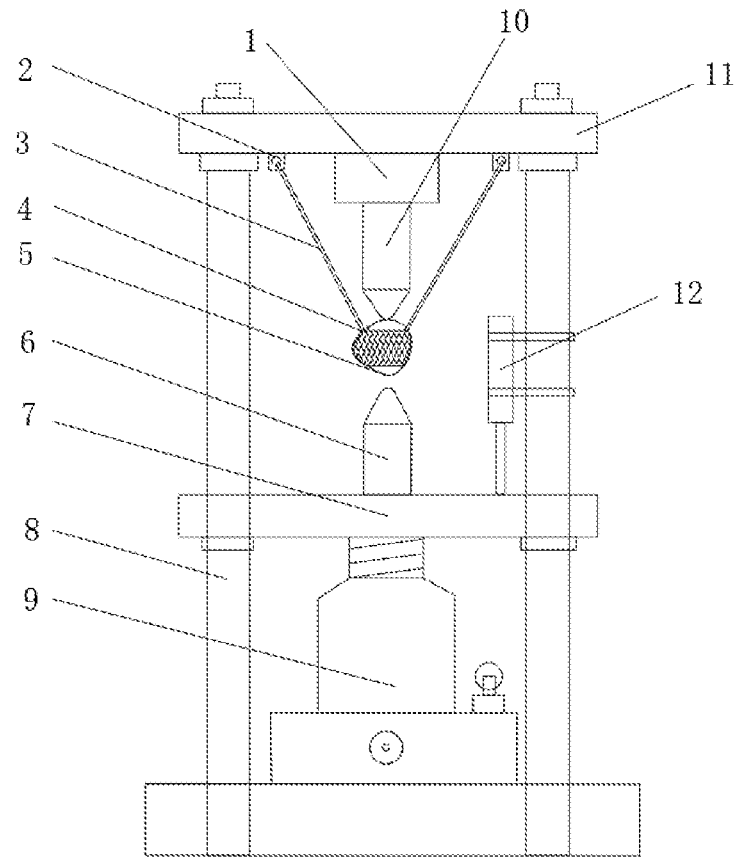
FIG. 2 is a structural diagram of a point loading tester of the present disclosure.

The point loading strength test module includes: a point loading tester, a rock fracture surface shooting frame and a flat plate. The point loading tester includes a pressure sensor 1, connecting holes 2, elastic ropes 3, an elastic net pocket 4, an upper conical indenter 6, a support beam I 7, support columns 8, a jack 9, a lower conical indenter 10, a support beam II 11, and a displacement meter 12, as shown in FIG. 2. The surfaces of the upper conical indenter 6 and the lower conical indenter 10 in contact with rock are not flat surfaces, so the rock should be fixed before loading. Only the middle part of the rock is wrapped by the elastic net pocket 4, which can be used to fix the rock next to the upper conical indenter without affecting the internal stress distribution of the rock during loading. The elastic net pocket 4 has certain elasticity and can adapt to rock of different sizes. After the rock is fractured, fragments are concentrated in the elastic net pocket 4 to prevent the fragments from splashing and save test time. The elastic net pocket is connected with the connecting holes 2 at the lower part of the support beam II 11 by the elastic ropes 3. The pressure sensor 1 detects the load of the conical indenters 6, 10 on the rock, the jack 9 is located under the support beam I, and the jack 9 provides power to the support beam I 7 and the lower conical indenter 10. The displacement meter 12 calculates rock deformation during compression.

The pressure sensor 1 is used to detect the load exerted on the rock by the upper conical indenter 6 and the lower conical indenter 10, and the pressure sensor is located between the lower conical indenter 10 and the second support beam II 11.

Figure 3:
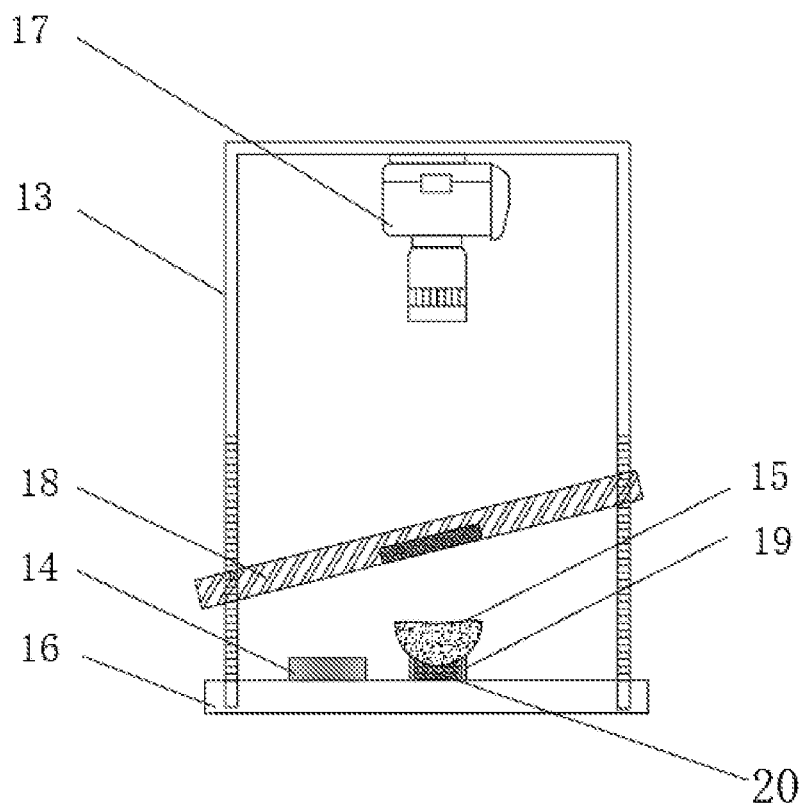
FIG. 3 is a schematic diagram of a rock fracture surface shooting frame of the present disclosure.
Figure 4:
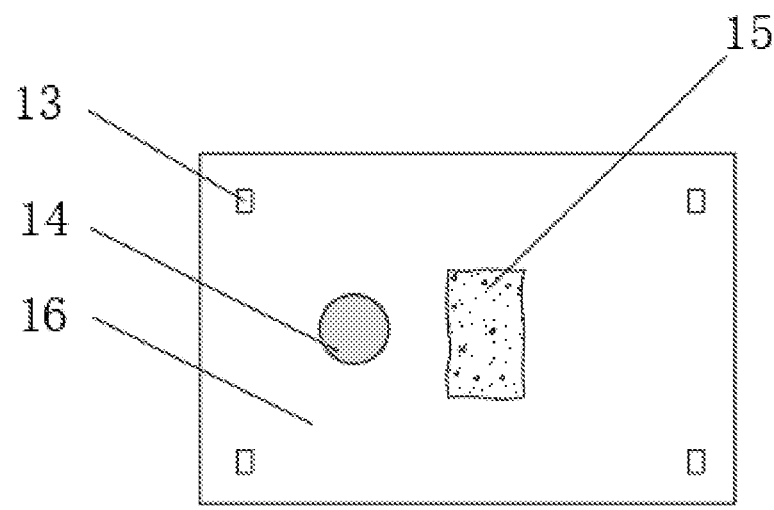
FIG. 4 is a top view of the rock fracture surface shooting frame of the present disclosure.

The rock fracture surface shooting frame includes columns 13, a calibration block 14, a fractured rock 15, a platform 16, a camera 17, a flat plate 18, a support shell 19, a first rubber block 20, and a second rubber block 21, as shown in FIGS. 3 and 4.

There are scales on sides of the columns 13, which provides a basis for correcting the posture of the fractured rock by using the flat plate. The support shell 19 and the first rubber block 20 are located under the rock to provide the possibility to adjust the posture of the rock. The first rubber block and the support shell are located under the fractured rock, the support shell is located outside the first rubber block to achieve a supporting effect, and the rubber block has certain elasto-plasticity, so that the position of the fractured rock can be greatly adjusted on the rubber block. The flat plate 18 has four outriggers, and the posture of the rock is adjusted by comparing the scale difference of the outriggers on the columns;

The calibration block 14 is used to calibrate the area of the fracture surface of the rock.

Both the calibration block 14 and the fractured rock 15 are placed on the platform, and the camera 17 is fixed to the upper end of the platform.

Figure 5:
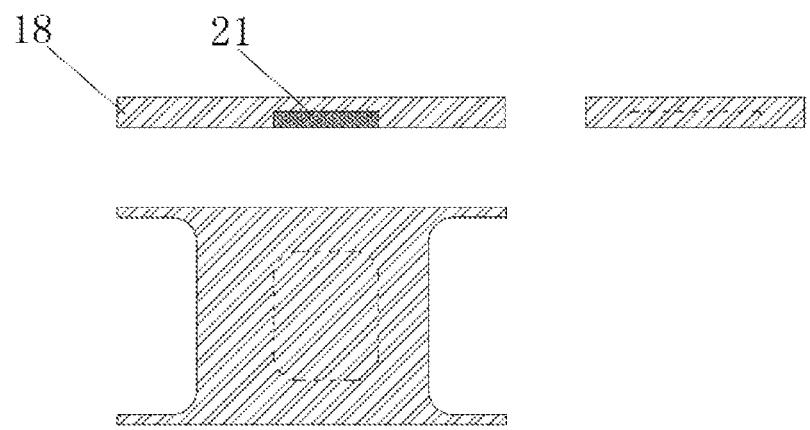
FIG. 5 is a three-dimensional view of a flat plate of the present disclosure.

The main body of the flat plate 18 is made of aluminum alloy, and a rubber block, that is, the second rubber block 21, is fixed in a certain area thereon. When the flat plate 18 is used to adjust the posture of the fractured rock, make sure that the second rubber block 21 should not be in point contact with the rock to ensure that the fracture surface is parallel to the platform 16 without being affected by protruding particles of the fractured rock, as shown in FIG. 5.

The point loading strength test is used to quickly obtain the point loading strength of the rock and transfer the point loading strength to the strength prediction module.

Figure 6:
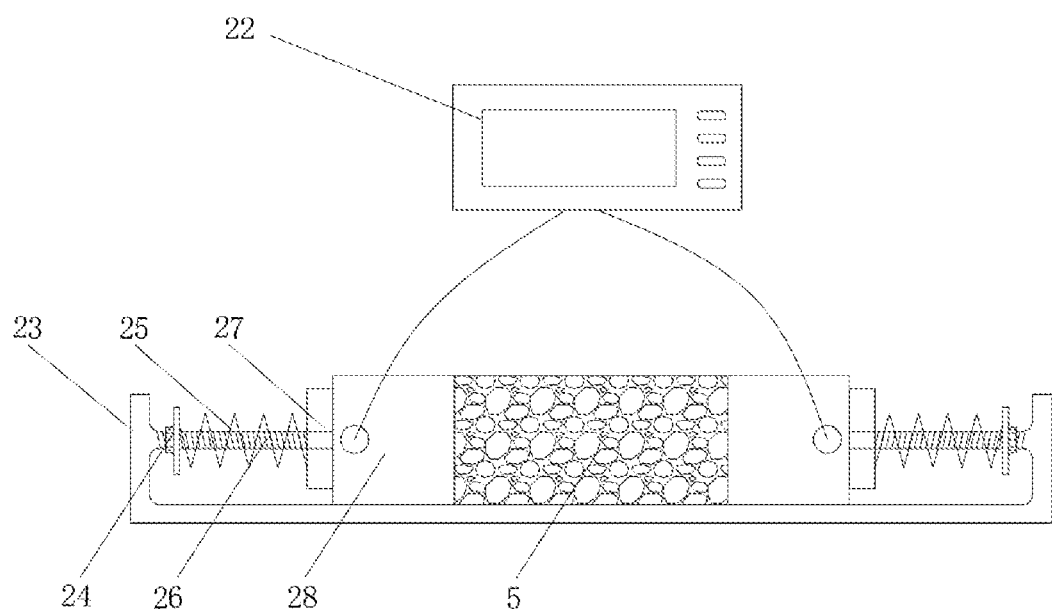
FIG. 6 is a longitudinal wave velocity measurement device of the present disclosure.

As shown in FIG. 6, the longitudinal wave velocity test module includes: a wave velocity measuring instrument 22, a pedestal 23, nuts 24, springs 25, bolts 26, spacers 27 and transducers 28.

The longitudinal wave velocity test module is used to quickly test the longitudinal wave velocity of the rock and transfer the result to the strength prediction module. The wave velocity measuring instrument 22 is used to measure the wave velocity of the rock; the transducers 28 are located on two sides of the rock; the transducers 28 are connected with the wave velocity measuring instrument 22; the nuts 24 can move on the bolts to compress the lengths of the springs; the spacers 27 are located between the springs 25 and the transducers 28 to transfer the compressive load and compress the sample; and the bolts 26 achieve the effect of supporting and transferring the load, so as to ensure that the springs 25 can apply pressure normally.

The rock rebound test module includes a rebound tester for measuring a rock rebound value and transferring the result to the strength prediction module.

The strength prediction module includes a trained neural network model for predicting the uniaxial compressive strength of the rock.

A working method of the predicting system for the uniaxial compressive strength of rock includes the following steps:

The positions of the nuts 24 on the bolts 26 are adjusted according to the size of the rock to ensure that the transducers 28 clamp the rock 5;

Longitudinal wave test is performed on the rock by using the longitudinal wave velocity measuring instrument 22, and the test result is transferred to the strength prediction module;

Rebound test is performed on the rock by using the rebound tester, and the rebound value is transferred to the strength prediction module;

The shape of the rock is observed, a load point is pre-selected on the rock and marked, then the rock is placed on the elastic net pocket 4 of the point loading tester, and the lengths of the elastic ropes 3 are adjusted to ensure that the rock is closely attached to the lower part of the lower conical indenter 10;

The jack 9 is controlled to push the support beam I and the upper conical indenter 6 to move up, get close to the sample and gradually fracture the rock, and the pressure and deformation are measured by using the pressure sensor 1 and the displacement meter 12 during the loading process;

The fractured rock is taken out from the elastic net pocket 4 and placed on the platform of the rock fracture surface shooting frame;

The first rubber block 20 and the support shell 19 are placed under the fractured rock, the posture of the fractured rock is adjusted by using the flat plate 18, and the second rubber block 21 on the characteristic flat plate should be aligned with the test block during the posture adjustment;

when the readings of four corners of the flat plate 18 on the columns 13 are identical (the fracture surface of the rock is substantially parallel to the platform), the flat plate is removed, a picture is taken with the camera, the area of the fracture surface of the rock is calculated by a section area algorithm, the point loading strength of the corrected rock is calculated with a formula, and the point loading strength is transferred to the intensity prediction module;

After receiving the point loading strength, longitudinal wave velocity, and rebound value, the strength prediction module provides a uniaxial compressive strength prediction result of the rock by using a model trained by machine learning technology, the rebound value, the longitudinal wave velocity, and the point loading strength.

Described above are merely preferred embodiments of the present disclosure, and the present disclosure is not limited thereto. Various modifications and variations may be made to the present disclosure for those skilled in the art. Any modifications, equivalent substitutions, improvements and the like made within the spirit and principle of the present disclosure shall fall within the scope of the present disclosure.

Although the specific embodiments of the present disclosure are described above in combination with the accompanying drawing, the protection scope of the present disclosure is not limited thereto. It should be understood by those skilled in the art that various modifications or variations could be made by those skilled in the art based on the technical solution of the present disclosure without any creative effort, and these modifications or variations shall fall into the protection scope of the present disclosure.

The invention claimed is:

1. A predicting system for the uniaxial compressive strength of rock, comprising a point loading strength test module, a longitudinal wave velocity test module, a rock rebound value test module and a strength prediction module, wherein:

the longitudinal wave velocity test module is configured to perform longitudinal wave velocity test on the rock, and transfer the longitudinal wave velocity of the rock to the strength prediction module;

the rock rebound test module is configured to perform rebound test on the rock, and transfer the rebound value of the rock to the strength prediction module;

the point loading strength test module comprises a point loading tester, a rock fracture surface acquisition module, and a rock fracture surface area calculation module; the point loading tester performs point loading test on the rock and transfers point loading stress and rock deformation data to the strength prediction module, the rock fracture surface acquisition module performs image acquisition on a fracture surface of the rock after being loaded and fractured by the point loading test, and the rock fracture surface area calculation module processes the image acquisition result to calculate the area of the fracture surface of the rock;

the strength prediction module is configured to output a uniaxial compressive strength prediction result of the rock according to the received information and a pre-trained neural network model.

2. The predicting system for the uniaxial compressive strength of rock according to claim 1, wherein the point loading tester comprises a base, an upper conical indenter, an elastic component, support beams, support columns, a jack and a lower conical indenter, wherein two support columns perpendicular to the base are arranged on the base, a support beam I and a support beam II are arranged between the two support columns, the lower conical indenter is fixed on the support beam II, the jack is arranged on the base, the jack can drive the support beam I and the upper conical indenter to move up and down, the upper conical indenter and the lower conical indenter are arranged oppositely, and the elastic component is arranged on the support columns or the support beam II and can movably fix the rock between the upper conical indenter and the lower conical indenter.

3. The predicting system for the uniaxial compressive strength of rock according to claim 1, wherein the point loading tester further comprises a displacement meter and a pressure sensor, the pressure sensor detects the pressure of the upper conical indenter or the lower conical indenter, and the displacement meter is fixed on the support column and can collect the deformation of the rock.

4. The predicting system for the uniaxial compressive strength of rock according to claim 1, wherein the elastic component comprises elastic ropes and an elastic net pocket, one end of the elastic rope is arranged on the support column or the support beam, the other end of the elastic rope is connected with the elastic net pocket, and the inside of the elastic net pocket is used for accommodating the rock.

5. The predicting system for the uniaxial compressive strength of rock according to claim 1, wherein the rock fracture surface acquisition module comprises columns, a platform, a camera, a flat plate, a first rubber block and a second rubber block; at least four columns are vertically arranged on the platform, ends of the flat plate are provided with threaded holes, the four columns respectively pass through the ends of the flat plate, at least the bottoms of the columns have threads adapted to the threaded holes, the first rubber block is arranged on the platform, the second rubber block is arranged at the lower end of the flat plate, the second rubber block and the first rubber block are arranged oppositely, and the camera is arranged at the upper end of the platform.

6. The predicting system for the uniaxial compressive strength of rock according to claim 1, wherein four columns are vertically arranged on the platform, four ends of the flat plate are provided with threaded holes, each column passes through the corresponding threaded hole of the flat plate, and at least the bottoms of the columns have threads adapted to the threaded holes.

7. The predicting system for the uniaxial compressive strength of rock according to claim 1, wherein the longitudinal wave velocity test module comprises a wave velocity measuring instrument, a pedestal, springs, bolts, spacers and transducers, wherein the transducers are located on both sides of the rock; the transducers are connected to the wave velocity measuring instrument, the opposite bolts are arranged inward at two ends of the pedestal, the bolts are sleeved with the springs, the spacers are arranged at the front ends of the springs, each spacer abuts against the corresponding transducer, and nuts movable along the bolts to compress the springs are arranged on the bolts.

8. A working method based on the predicting system according to claim 1, comprising the following steps:
    performing longitudinal wave velocity test on rock by using the longitudinal wave velocity tester;
    performing rebound test on the rock by using the rebound tester;
    observing the shape of the rock, pre-selecting a rock loading point, putting the rock into an elastic net pocket, fixing the rock to the lower part of the upper conical indenter, and fracturing the rock by pressing;
    calculating a point loading strength by means of the area of a fracture surface of the rock and rock fracture load; and
    predicting the lithology of the rock according to the fracture surface of the rock, predicting the strength of the rock by means of the point loading strength, longitudinal wave velocity and rebound value of the rock, and outputting the prediction results.

9. The working method according to claim 8, wherein a calibration block is placed beside the fractured rock, the posture of the fractured rock is adjusted, the fractured surface is adjusted to be parallel to the plane of the platform, and the cross section of the fractured rock is photographed; the number of pixels occupied by the fracture surface of the rock is calculated by a region growing algorithm, the number of pixels occupied by the calibration block is calculated by the region growing algorithm, and under the condition that the area of the calibration block is known, the area of the fracture surface of the rock can be solved by means of the ratio of the number of pixels occupied by the fracture surface of the rock to the number of pixels occupied by the calibration block.

10. The working method according to claim 9, wherein the specific process of calculating the number of pixels occupied by the calibration block by the region growing algorithm comprises:
    1) Performing column sum processing on RGB values of the captured image respectively to form row vectors, and extracting left and right boundaries on the basis of the difference in color between the rock and a background plate;
    2) Performing row sum processing on the RGB values of the captured image respectively to form column vectors, and extracting up and down boundaries on the basis of the difference in color between the rock and the background plate to form a rock region box;
    3) Graying the image;
    4) Averaging the gray values of all pixels in the rectangular rock region box to form a screening threshold;
    5) Determining the gray values of all the pixels in the rock region box; if the gray values are greater than the screening threshold, determining the pixels as quartz seed points to form preliminary quartz region growing seeds;
    6) Sequentially popping up the quartz region growing seed points, and determining the relationship between 8 neighborhoods around a seed point; if the absolute values of differences between the gray values of the 8 neighborhood pixels and the seed pixel are less than a certain threshold T, regarding the point as a seed point for next growth; and
    7) Repeating step 6) and ending the growth until every point in the rock region box has been determined, the number of seed points being the number of pixels on the fracture surface of the rock.

* * * * *